United States Patent
Wack

(10) Patent No.: US 6,364,081 B1
(45) Date of Patent: Apr. 2, 2002

(54) HYDRODYNAMIC TORQUE CONVERTER

(75) Inventor: Erwin Wack, Niederwerrn (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/556,269

(22) Filed: Apr. 24, 2000

(30) Foreign Application Priority Data

Apr. 22, 1999 (DE) .......................................... 199 18 278

(51) Int. Cl.⁷ .............................................. F16D 31/00
(52) U.S. Cl. ...................................... 192/3.28; 192/212
(58) Field of Search .............................. 192/3.28, 212, 192/200, 3.3; 464/68

(56) References Cited

U.S. PATENT DOCUMENTS

| | | | | |
|---|---|---|---|---|
| 4,548,309 A | * | 10/1985 | Braun .................. | 192/70.17 X |
| 4,871,342 A | * | 10/1989 | Boss et al. ..................... | 464/98 |
| 5,064,041 A | * | 11/1991 | Graton et al. ......... | 192/70.17 X |
| 5,884,743 A | * | 3/1999 | Kleifges et al. ..... | 192/70.17 X |
| 5,893,446 A | * | 4/1999 | Honjo et al. ........ | 192/213.22 X |
| 6,146,279 A | * | 11/2000 | Lebas et al. ............ | 192/214 X |

FOREIGN PATENT DOCUMENTS

DE   32 48 119 C2   6/1984   ........... F16D/13/64

\* cited by examiner

*Primary Examiner*—Charles A Marmor
*Assistant Examiner*—Saul Rodriguez
(74) *Attorney, Agent, or Firm*—Cohen, Pontani, Lieberman & Pavane

(57) ABSTRACT

A hydrodynamic torque converter having a torsional vibration damper arrangement which is arranged in a torque-transmission path between a lockup clutch of the torque converter and a turbine impeller of the torque converter. The torsional vibration damper arrangement has a primary side, which is coupled to the lockup clutch or forms a part thereof, and a secondary side, which is coupled to the turbine impeller and/or forms a part thereof. The primary side and the secondary side are able to rotate with respect to one another about a converter axis of rotation, counter to the action of a damper spring arrangement. The turbine impeller has a bearing area for the primary side, which allows radial movement of the primary side with respect to the turbine impeller.

13 Claims, 3 Drawing Sheets

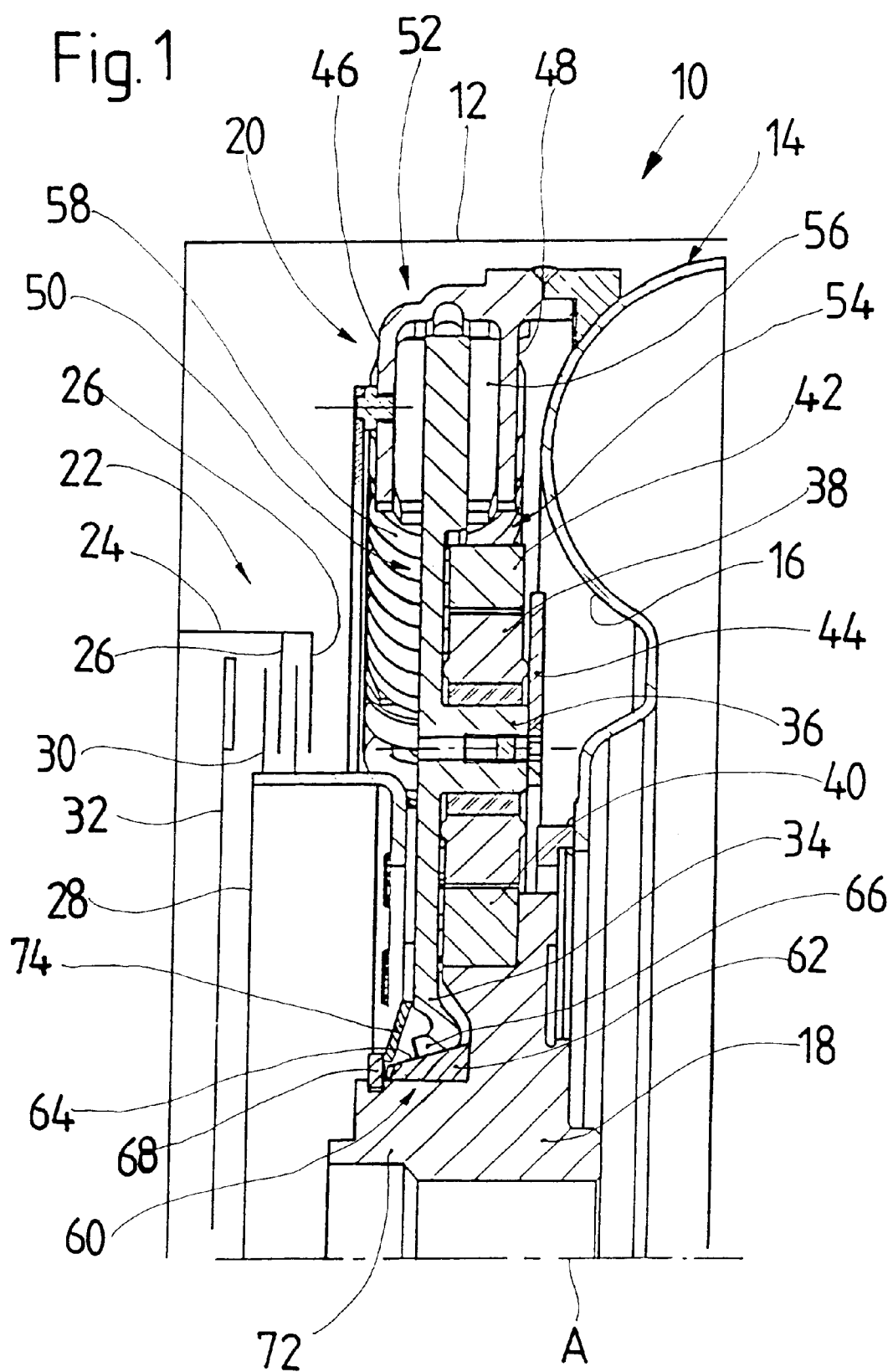

HYDRODYNAMIC TORQUE CONVERTER

BACKGROUND OF THE INVENTION

1. Field of the Invention

The present invention relates to a hydrodynamic torque converter, comprising a torsional vibration damper arrangement which is arranged in a torque-transmission path between a lockup clutch of the torque converter and a turbine impeller of the torque converter. The torsional vibration damper arrangement has a primary side, which is coupled to the lockup clutch or forms a part thereof, and a secondary side, which is coupled to the turbine impeller and/or forms a part thereof. The primary side and the secondary side are able to rotate with respect to one another about a converter axis of rotation, counter to the action of a damper spring arrangement.

2. Description of the Related Art

When fitting such hydrodynamic torque converters into a drive system, the problem is often encountered that there is a very slight axial offset or a very slight axial inclination between a crankshaft, which is to be connected to a converter casing, and a converter output shaft which is to be connected to the turbine impeller, generally the transmission input shaft. This axial inclination may lead to radial forces being produced in the area of the torsional vibration damper during operation, and these forces, particularly in the area of various bearings, may lead to excessive wear and to components seizing up.

German reference DE 32 48 119 C2 has disclosed a clutch disk in which a torsional vibration damper integrated therein comprises two cover plates and one hub plate between them. One of the cover plates is guided over an inclined surface on the hub, so that a preloading device which is provided is able to automatically center these two damper areas, and imbalance in the clutch disk can be avoided in operation.

SUMMARY OF THE INVENTION

The object of the present invention is to provide a hydrodynamic torque converter or a torsional vibration damper therefor with which, by simple structural measures, the problems induced by an axial offset are eliminated.

According to the invention, this object is achieved by means of a hydrodynamic torque converter comprising a torsional vibration damper arrangement which is arranged in a torque-transmnission path between a lockup clutch of the torque converter and a turbine impeller of the torque converter. The torsional vibration damper arrangement has a primary side, which is coupled to the lockup clutch or forms a part thereof, and a secondary side, which is coupled to the turbine impeller and/or forms a part thereof. The primary side and secondary side are able to rotate with respect to one another about a converter axis of rotation, counter to the action of a damper spring arrangement. The turbine impeller has a bearing area for the primary side, which allows radial movement of the primary side with respect to the turbine impeller.

Since, in the torque converter according to the invention, the primary side is mounted on the turbine impeller in such a manner that radial movement between these two components is possible, any axial offset which is present cannot lead to jamming in this bearing area, with the result that the wear is significantly reduced and the risk of seizing up is avoided.

By way of example, it is possible for the bearing area to form a bearing surface which narrows in one direction of the axis of rotation and on which the primary side bears by way of a mating bearing surface.

In this case, the radial movement facility can be obtained in a simple manner if the primary side is preloaded by a preloading arrangement in a direction, with respect to the turbine impeller, in which the bearing surface widens.

By way of example, the preloading arrangement may comprise a preloading spring, preferably a diaphragm spring, which is supported on the turbine impeller, on the one hand, and on the primary side, on the other hand.

The bearing area may, for example, be of frustoconical design or may form a bearing surface with a curved contour.

In order to be able to optimize the bearing area with regard to the particular requirements, i.e. in order for it to be possible to use a material with suitable bearing or sliding properties, it is proposed for the bearing area to be formed by a bearing component arranged on the turbine impeller.

As an alternative, however, in order to obtain a structure which is as simple and inexpensive as possible, it is possible for the bearing area to be formed by a surface section of the turbine impeller.

In the hydrodynamic torque converter according to the invention, the structure may, for example, be such that the secondary side has two covering-disk areas which are arranged at an axial distance from one another and between which there is a central disk element of the primary side. The damper spring arrangement has at least one damper spring which is supported on the covering-disk areas or the central disk element. Furthermore, the central disk element is mounted on the bearing area.

In order to allow the damping characteristic of the torsional vibration damper arrangement in the hydrodynamic torque converter according to the invention to be adapted to different damping requirements, it is proposed for the central disk element rotatably to support at least one flywheel mass, preferably a planet wheel, which flywheel mass is driven in rotation in the event of relative rotation between the primary side and the secondary side.

In this case, it is possible for the at least one flywheel mass to be driven in rotation by the turbine impeller and/or a component which is connected thereto.

The present invention also relates to a torsional vibration damper, in particular for a hydrodynamic torque converter, comprising a primary side, which is or can be connected to a primary component, and a secondary side, which is or can be connected to a secondary component. The primary side and the secondary side are able to rotate with respect to one another about an axis of rotation, counter to the action of a damper spring arrangement. The primary side furthermore is mounted on a bearing area of the secondary component in such a manner that it can be displaced in the radial direction.

A torsional vibration damper of this nature provides a very compact structure, since the primary side is mounted directly on that component which is driven in rotation by the secondary side or is rotatably coupled thereto. Furthermore, the radial movement which is made possible can be used to avoid the occurrence of jamming in this bearing area.

By way of example, it is possible for the bearing area to form a bearing surface which narrows in one direction of the axis of rotation, and for the primary side to be preloaded with respect to the secondary component, by a preloading arrangement, in a direction in which the bearing surface widens.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

FIG. 1 shows a partial longitudinal section through a hydrodynamic torque converter according to the invention;

DETAILED DESCRIPTION OF THE PRESENTLY PREFERRED EMBODIMENTS

Figure 3:
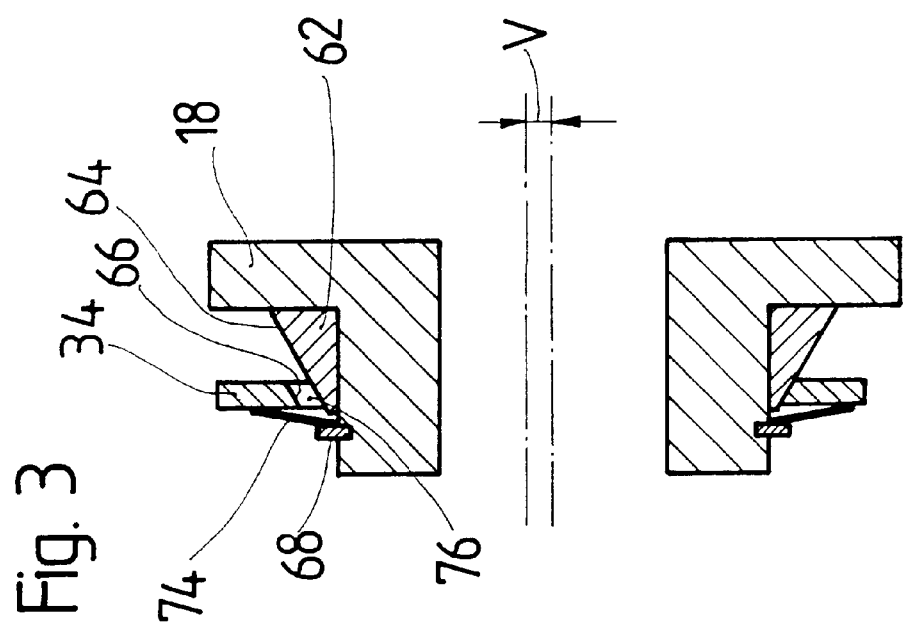
FIG. 3 shows a view which corresponds to FIG. 2 and in which the compensation for an axial offset is illustrated.

FIG. 1 diagrammatically and only partially depicts a torque converter 10. The converter 10 comprises a casing 12 which, in a manner known per se, is or can be coupled in a rotationally fixed manner to a drive shaft, for example a crankshaft of an internal combustion engine. Furthermore, the casing 12 bears a pump impeller (not shown) with pump impeller blades provided thereon. In the interior of the casing 12, there is a turbine impeller 14 which has a turbine impeller shell 16 and a turbine impeller hub 18 which is coupled fixedly to the turbine impeller shell 16. The turbine impeller hub 18 is coupled in a rotationally fixed manner to a transmission input shaft, in a manner which is known per se. Furthermore, there is a torsional vibration damper 20 which produces a rotational connection between a lockup clutch 22 and the turbine impeller 14. The lockup clutch 22 is only diagrammatically depicted and may, for example, have an outer plate carrier 24, which is fixedly connected to the casing 12 and has a plurality of outer plates 26 provided thereon, and an inner plate carrier 28 with a plurality of inner plates 30 provided thereon. The lockup clutch 22 also comprises a clutch piston 32 which, owing to the pressure conditions prevailing inside the converter, presses the outer plates 26 and the inner plates 30 against one another and thus produces a rotational connection between the casing 12 and the inner plate carrier 28. The inner plate carrier 28 is connected in a rotationally fixed manner, by means of a plurality of riveted bolts or the like, to a central disk 34 of the torsional vibration damper 20, which at the same time also forms a planet wheel carrier. As described in more detail below, this central disk 34 is mounted rotatably on the turbine impeller 14, i.e. its hub 18, and has a plurality of bearing projections 36 distributed in the circumferential direction in its central area, on which bearing projections planet wheels 38 are rotatably mounted. Radially on the inside, the planet wheels 38 mesh with a sun wheel 40 which is provided on the turbine impeller hub 18 and could also be formed integrally with the turbine impeller hub 18. Radially on the outside, the planet wheels 38 mesh with a ring gear 42 which is mounted in a floating position. There is an annular securing plate 44 which, together with the central disk 34, provides an axial bearing for the planet wheels 38 and also the ring gear 42. For this purpose, the planet wheels 38 have protruding sections which can be formed during production and ultimately provide axial support or bearing for the planet wheels 38.

In the radially outer area, the central disk 34 lies between two covering disk areas 46, 48 which are provided integrally on an annular component. This annular assembly, which forms, for example, the secondary side 52 of the torsional vibration damper 20, is connected to the turbine impeller shell 16 in a rotationally fixed manner by welding or in some other way. In this sense, the central disk 34 forms a primary side 50 of the torsional vibration damper 20, and it should be pointed out in this context that the terms primary side and secondary side are in no way intended to restrict the invention to a torque having to be introduced only via the primary side and output via the secondary side. This ultimately depends on whether a drive system is in overrun or traction mode.

In a manner which is known per se, the central disk 34 and the covering disk areas 46, 48 form respective spring windows with control areas against which end areas, lying in the circumferential direction, of damper springs 54 are supported, if appropriate with spring diaphragms 56 in between. The spring diaphragms 56 are supported radially on the outside against the assembly which bears the covering disk areas 46, 48. In each spring window formed in this way, there may be at least one damper spring 54 of this nature, but preferably the damper spring arrangement 58 which counteracts relative rotation between primary side 50 and secondary side 52 has a plurality of damper springs 56, which are supported against each other by way of guide shoes, in each of the spring windows in succession.

If, during rotation, the torque which is to be transmitted changes relatively spontaneously, this leads to a relative rotation between the primary side 50 and the secondary side 52, during which the damper springs 56 are compressed, as is known. At the same time, during this relative rotation, the planet wheels 38 are set in rotation by the sun wheel 40, and the ring gear 42 is set in rotation by the planet wheels 38, so that as a result of the rotation of various masses, additional energy can be stored in the torsional vibration damper. During this relative rotation, therefore, the central disk 34 also rotates with respect to the turbine impeller hub 18, this being made possible by means of a bearing area 60 which is provided on the turbine impeller hub 18. It can be seen from FIGS. 1 and 2 that this bearing area 60 comprises a bearing ring 62 which is arranged, for example held in a rotationally fixed position, on the turbine impeller 18 and forms a conically narrowing bearing surface 64. Corresponding to the conical bearing surface 64, the central disk 34 has a conical mating bearing surface 66 which is formed by deformation on a radially inner area and rests on the bearing surface 64.

On the turbine impeller hub 18 there is also a securing ring 68 which engages in a groove 70 in an axial shoulder 72 of the turbine impeller hub 18 and is thus fixed in the axial direction. A preloading spring 74, for example a diaphragm spring, is supported, in its radially inner area, against the securing ring 68. In its radially outer area, this preloading spring 74 applies a load to the central disk 34 in such a manner that it is pressed in a direction in which the conical bearing surface 64 widens, i.e. adopts an increasingly great radial distance from the axis of rotation A.

Since the bearing ring 62 is preferably formed from a sliding-contact bearing material, the preloading which is generated and the associated slight wedging action makes it easy for the central disk 34 to slide along the bearing ring 62.

Figure 2:
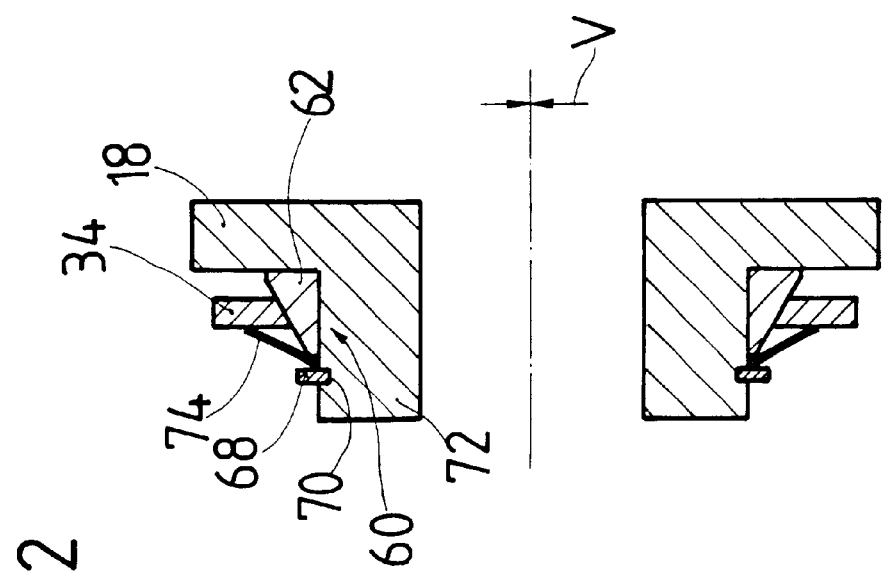
FIG. 2 shows an enlarged view of the bearing area on the turbine impeller.

As has already been described above, it is often the case in drive systems that there is a slight axial offset between the drive shaft, for example the crankshaft, and the output shaft, for example the transmission input shaft, so that there is a risk of excessive loads being applied to the bearing area 60 when the lockup clutch 22 is in its engaged position. In the present invention, however, an axial offset of this nature can be compensated for entirely without jamming. This is made clear by FIGS. 2 and 3. FIG. 2 shows a state in which the axial offset V is zero and the central disk 34 has moved its farthest distance axially toward the large-diameter area of the bearing ring 62. If there is an axial offset V, as shown in FIG. 3, the central disk 34 can move in the radial direction, together with the casing, with respect to the turbine impeller hub 18 due to the fixed coupling provided by the lockup clutch 22, while at the same time, owing to the radial movement which has been made possible by the conical bearing surface 64, the central disk 34 is displaced axially in the direction of an area of the bearing surface 64 which is at a shorter radial distance from the axis of rotation A. This applies an increasing load to the preloading spring 74, in order to generate a restoring force for the central disk 34. Therefore, the axial displacement of the central disk 34 which takes place generates a small space 76 in a peripheral area between the bearing surface 64 and the mating bearing surface 66. It should be noted that in the embodiment shown in FIGS. 2 and 3 and also the following embodiments which are yet to be described, the mating bearing surface 66 is produced not by deformation but rather by forming a tapering opening in the central disk 34.

If, in such an operating state, the lockup clutch 22 is opened, the central disk 34 can return to the position illustrated in FIG. 2 through the action of the preloading force generated by means of the preloading spring 74, without any radial constraining forces occurring. Centering with respect to the turbine impeller hub 18 is then restored.

FIGS. 4 to 7 show a number of variant designs of the bearing area 60.

Figure 4:
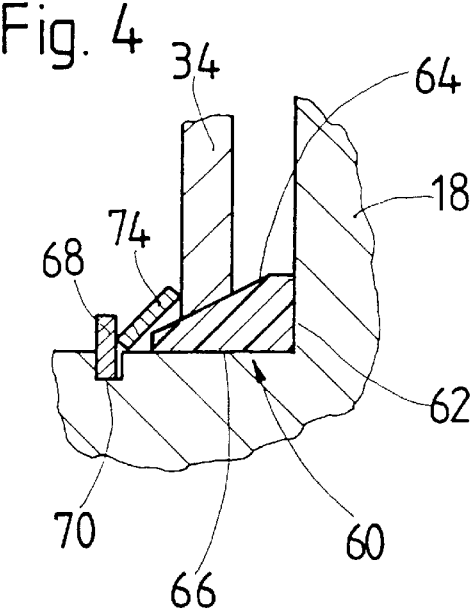
FIGS. 4 to 7 show various embodiments of the bearing area.

FIG. 4 differs from the embodiment shown in FIGS. 1 to 3 in that the diaphragm spring 74 has a shorter radial extent, an increased axial distance also being present between the bearing ring 62 and the securing ring 68. It can also be seen that the mating bearing surface 66 is in turn formed by making a widening opening in the central disk 34. The bearing ring 62 may, for example, be designed as a plastic element which has desired sliding properties.

Figure 5:
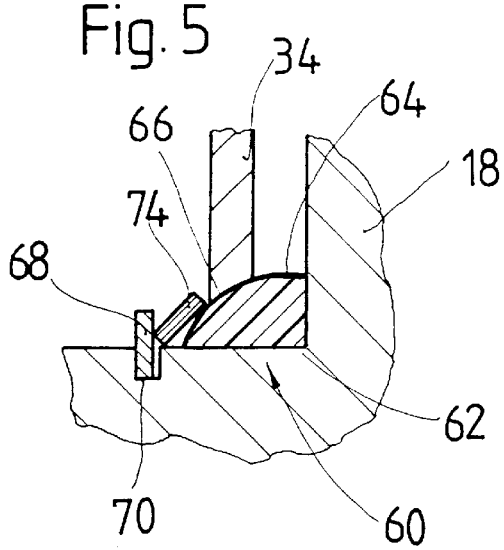

In the embodiment shown in FIG. 5, the bearing ring 62 is not designed so as to taper conically or frustoconically, but rather has a curved, in particular outwardly, i.e. convexly curved, bearing surface contour. In a corresponding way, the mating bearing surface 66 formed on the central disk 34 has a complementary concavely curved contour.

Figure 6:
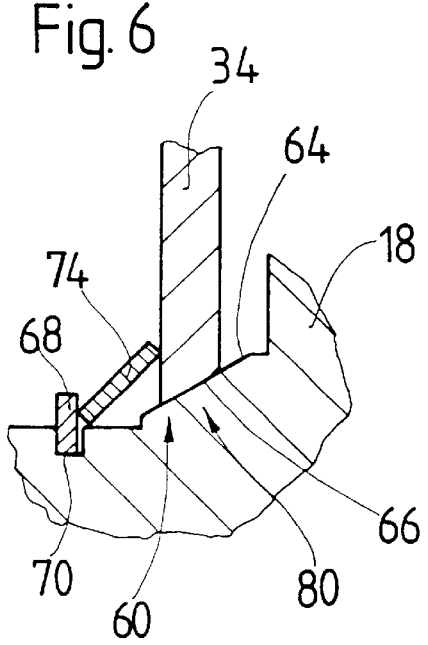

In the embodiment shown in FIG. 6, there is no separate bearing ring, but rather a surface area 80 of the turbine impeller hub 18 forms the bearing surface 64. This surface area 80 may have been formed during production of the turbine impeller hub 18.

Figure 7:
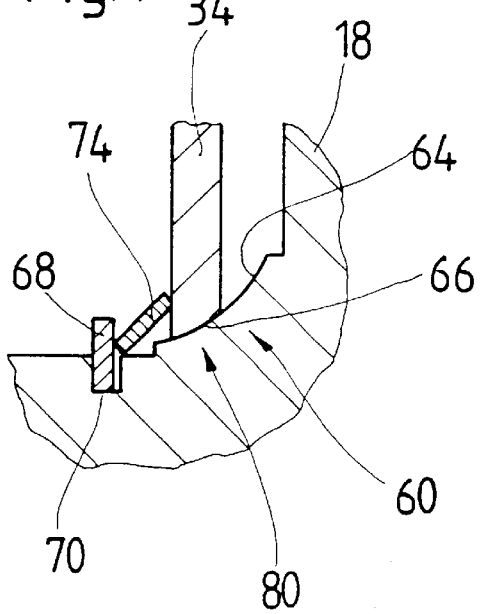

In the embodiment shown in FIG. 7, the bearing surface 64 is likewise formed by a surface area 80 of the turbine impeller hub 18, but in this case the bearing surface 64 again has a curved, but in this case concavely curved, contour. In a corresponding way, the mating bearing surface 66 in this case has a complementary convexly curved contour.

The present invention provides a torsional vibration damper or a hydrodynamic torque converter with a torsion vibration damper in which an axial offset which is present between two components coupled to the primary side and the secondary side of the torsional vibration damper can be compensated for. In order not to impede this compensation operation, in particular in the case of the hydrodynamic torque converter which has the planet wheels which are in rotary driving connection with the turbine impeller, it is advantageous in this case if the sets of toothing of the planet wheels 38, on the one hand, and of the sun wheel 40, on the other hand, are adapted to one another in such a way that there is a slight radial movement play between them.

The invention is not limited by the embodiments described above which are presented as examples only but can be modified in various ways within the scope of protection defined by the appended patent claims.

I claim:

1. A hydrodynamic torque converter, comprising: a turbine impeller; a lockup clutch; a damper spring arrangement; and a torsional vibration damper arrangement arranged in a torque-transmission path between the lockup clutch and the turbine impeller, the torsional vibration damper arrangement having a primary side which one of is coupled to the lockup clutch and forms a part of the lockup clutch, and a secondary side which is at least one of coupled to the turbine impeller and forms a part of the turbine impeller, the primary side and the secondary side being able to rotate with respect to one another about a converter axis of rotation, counter to action of the damper spring arrangement, the turbine impeller having a bearing area for the primary side which allows radial movement of the primary side with respect to the turbine impeller.

2. A hydrodynamic torque converter as defined in claim 1, wherein the bearing area forms a bearing surface which narrows in one direction of the axis of rotation and on which the primary side bears by way of a mating bearing surface.

3. A hydrodynamic torque converter as defined in claim 2, and further comprising a preloading arrangement arranged so as to preload the primary side in a direction, with respect to the turbine impeller, in which the bearing surface widens.

4. A hydrodynamic torque converter as defined in claim 3, wherein the preloading arrangement comprises a preloading spring which is supported on the turbine impeller, on the one hand, and on the primary side, on the other hand.

5. A hydrodynamic torque converter as defined in claim 4, wherein the preloading spring is a diaphragm spring.

6. A hydrodynamic torque converter as defined in claim 2, wherein the bearing area is formed as a substantially conical bearing surface.

7. A hydrodynamic torque converter as defined in claim 2, wherein the bearing area is formed as a bearing surface with a curved contour.

8. A hydrodynamic torque converter as defined in claim 1, wherein the bearing area is formed by a bearing component arranged on the turbine impeller.

9. A hydrodynamic torque converter as defined in claim 1, wherein the bearing area is formed by a surface section of the turbine impeller.

10. The hydrodynamic torque converter as defined in claim 1, wherein the secondary side has two covering-disk areas which are arranged at an axial distance from one another and between which there is a central disk element of the primary side, the damper spring arrangement having at least one damper spring which is supported on one of the covering-disk areas and the central disk element, the central disk element being mounted on the bearing area.

11. A hydrodynamic torque converter as defined in claim 10, wherein the central disk element rotatably supports at least one flywheel mass that is driven in rotation by relative rotation between the primary side and the secondary side.

12. A hydrodynamic torque converter as defined in claim 11, wherein the flywheel mass is a planet wheel.

13. A hydrodynamic torque converter as defined in claim 11, wherein the at least one flywheel mass is driven in rotation by at least one of the turbine impeller and a component connected to the turbine impeller.

* * * * *